(12) United States Patent
Yazawa et al.

(10) Patent No.: US 12,199,882 B2
(45) Date of Patent: Jan. 14, 2025

(54) INFORMATION PROCESSING APPARATUS, COMMUNICATION APPARATUS, INFORMATION PROCESSING METHOD AND PROGRAM

(71) Applicant: NIPPON TELEGRAPH AND TELEPHONE CORPORATION, Tokyo (JP)

(72) Inventors: Go Yazawa, Musashino (JP); Takahiro Kubo, Musashino (JP); Natsuki Yasuhara, Musashino (JP); Shinichi Yoshihara, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 18/276,883

(22) PCT Filed: Mar. 4, 2021

(86) PCT No.: PCT/JP2021/008519
§ 371 (c)(1),
(2) Date: Aug. 11, 2023

(87) PCT Pub. No.: WO2022/185490
PCT Pub. Date: Sep. 9, 2022

(65) Prior Publication Data
US 2024/0129254 A1   Apr. 18, 2024

(51) Int. Cl.
*H04L 47/56* (2022.01)
*H04L 47/28* (2022.01)

(52) U.S. Cl.
CPC ............ *H04L 47/56* (2013.01); *H04L 47/28* (2013.01)

(58) Field of Classification Search
CPC ................... H04L 47/56; H04L 47/28
(Continued)

(56) References Cited

U.S. PATENT DOCUMENTS

| | | | |
|---|---|---|---|
| 2017/0208755 A1* | 7/2017 | Kaminski | G05B 19/042 |
| 2018/0192327 A1* | 7/2018 | Gaydos | H04L 47/125 |

(Continued)

OTHER PUBLICATIONS

Sakagami et al., "A Study and an Evaluation on Hitless Switching Scheme for Dedicated Ethernet", The Institute of Electronics, Information and Communication Engineers, IEICE Technical Report, CS2013-I, vol. 113, No. 6, Mar. 2013, pp. 1-5 (10 pages including English Translation).

*Primary Examiner* — Karen C Tang
(74) *Attorney, Agent, or Firm* — XSENSUS LLP

(57) ABSTRACT

An information processing device in a communication apparatus performs a management process of traffic flow management information for transfer of data including a plurality of frames from a transmission source terminal to a transmission destination terminal. Where new traffic flow management information of a traffic flow associated with a data frame identified by an identification unit on the basis of identification information included in the received data frame is recorded in the communication apparatus, a recording unit determines whether the number of pieces of traffic flow management information already recorded is equal to or more than a threshold value, and calculates and records a scheduled release time of the traffic flow management information according to a determination result.

9 Claims, 11 Drawing Sheets

(58) Field of Classification Search
USPC .......................................................... 709/224
See application file for complete search history.

(56) References Cited

U.S. PATENT DOCUMENTS

| | | | |
|---|---|---|---|
| 2021/0376985 A1* | 12/2021 | Zhou | H04W 72/1268 |
| 2022/0330085 A1* | 10/2022 | Li | H04L 67/565 |
| 2023/0246963 A1* | 8/2023 | Kulkarni | H04L 45/38 |
| | | | 370/235 |

* cited by examiner

Fig. 4

| NUMBER OF PIECES OF RECORDED TRAFFIC FLOW MANAGEMENT INFORMATION | RECORDING STORAGE TIME (s) |
|---|---|
| 0 TO 64 | 1.0 |
| 65 TO 128 | 0.2 |

Fig. 5

| TRAFFIC FLOW ID | TRAFFIC FLOW IDENTIFICATION INFORMATION |
|---|---|
| 0001 | X1 |
| 0002 | Y8 |
| 0003 | Z2 |
| 0005 | W10 |

Fig. 6

| TRAFFIC FLOW ID | NUMBER OF PIECES OF TRAFFIC FLOW MANAGEMENT INFORMATION WHEN NEW TRAFFIC FLOW MANAGEMENT INFORMATION IS REGISTERED | SCHEDULED RELEASE TIME |
|---|---|---|
| 0001 | 2 | 10:01:23.07 |
| 0002 | 150 | 10:01:22.77 |
| 0003 | 34 | 10:01:22.87 |
| 0005 | 100 | 10:01:22.75 |

Fig. 8

| TRAFFIC FLOW ID | TRAFFIC FLOW IDENTIFICATION INFORMATION |
|---|---|
| 0001 | X1 |
| 0002 | Y8 |
| 0003 | Z2 |
| 0005 | W10 |
| 0007 | A5 |

Fig. 9

| TRAFFIC FLOW ID | NUMBER OF PIECES OF TRAFFIC FLOW MANAGEMENT INFORMATION WHEN NEW TRAFFIC FLOW MANAGEMENT INFORMATION IS REGISTERED | SCHEDULED RELEASE TIME |
|---|---|---|
| 0001 | 2 | 10:01:23.07 |
| 0002 | 150 | 10:01:22.77 |
| 0003 | 34 | 10:01:22.87 |
| 0005 | 100 | 10:01:22.75 |
| 0007 | 4 | 10:01:23.67 |

Fig. 10

| TRAFFIC FLOW ID | NUMBER OF PIECES OF TRAFFIC FLOW MANAGEMENT INFORMATION WHEN NEW TRAFFIC FLOW MANAGEMENT INFORMATION IS REGISTERED | SCHEDULED RELEASE TIME |
|---|---|---|
| 0001 | 2 | 10:02:23.07 |
| 0002 | 150 | 10:02:22.77 |
| 0003 | 34 | 10:02:22.87 |
| 0005 | 100 | 10:02:22.75 |
| 0007 | 4 | 10:02:23.67 |

INFORMATION PROCESSING APPARATUS, COMMUNICATION APPARATUS, INFORMATION PROCESSING METHOD AND PROGRAM

CROSS-REFERENCE TO RELATED APPLICATION

The present application is based on PCT filing PCT/JP2021/008519, filed Mar. 4, 2021, the entire contents of which are incorporated herein by reference.

TECHNICAL FIELD

Embodiments of the present invention relate to an information processing device, a communication apparatus, an information processing method, and a program.

BACKGROUND ART

There are a certain number of users who desire a network service with a short communication interruption time due to redundancy switching. For example, Non Patent Literature 1 discloses an uninterrupted redundancy switching technique as a technique for providing a network service with a short communication interruption time. Ethernet (registered trademark) is generally used as the network.

In the technology disclosed in Non Patent Literature 1, in the transmission/reception one-to-one configuration, a device (hereinafter, referred to as an uninterruptible apparatus) that performs uninterrupted processes located in a transmission source base duplicates a user data frame that is a transmission target provided from a user terminal at the transmission source base. The duplicated frame is transferred from the uninterruptible apparatus through two different routes of a relay network, and reaches an uninterruptible apparatus disposed at a destination base. In the uninterruptible apparatus at the destination base, one of the same frames arriving from two routes is selected and transferred to a user terminal at the destination base.

In order to manage how far a frame has been transmitted and received in each relay network, an uninterruptible apparatus that is a transmission source assigns a sequence number as traffic flow management information to a frame to be duplicated. An uninterruptible apparatus that is a destination stores a sequence number of a frame to be processed next in the form of an expected number. When a frame with a number different from the expected number arrives, the uninterruptible apparatus that is a destination waits until the frame with the expected number arrives. Consequently, it is possible to realize communication without skipping in the order of frames.

CITATION LIST

Non Patent Literature

Non Patent Literature 1: Sakagami et al., "A Study and an Evaluation on Hitless Switching Scheme for Duplicated Ethernet", IEICE Technical Report, vol. 113, no. 6, CS2013-1, pp. 1-5, April 2013

SUMMARY OF INVENTION

Technical Problem

In not only a transmission/reception one-to-one configuration but also a one-to-n (where n≥2) configuration, that is, communication between multiple bases having a plurality of reception sides, similarly, there is a demand for a network service that makes a route redundant for high reliability and switches between routes in an uninterrupted manner by using an uninterruptible apparatus at the time of failure or the like.

For example, when a user data frame addressed to a user terminal B and a user data frame addressed to a user terminal C are mixed and received from a user terminal A in an uninterruptible apparatus A, the uninterruptible apparatus A allocates sequence numbers to the mixed user data frames and transmits the sequence numbers to the network. Alternatively, the uninterruptible apparatus A associates a pair of uninterruptible apparatuses as one traffic flow, assigns a sequence number to each of the pairs, and transmits the associated traffic flow to a network. In a network using Ethernet, a frame addressed to the user terminal B is received only by an uninterruptible apparatus B and a frame addressed to the user terminal C is received only by an uninterruptible apparatus C through MAC address learning in a network switch by the network switch disposed in the network.

However, for example, in a case where the MAC address learning information of the network switch is flushed (erased) and flooding occurs, the uninterruptible apparatus also receives a data frame addressed to another device. Thus, in the uninterruptible apparatus, it is necessary to secure a communication resource, which is a sequence number of a data frame in a plurality of traffic flows, more than necessary, which causes an increase in device cost.

It is conceivable to increase the aging time (time until release) of a resource in order to secure an original communication resource even at the time of flooding. However, in such a way, in a case where all resources have been allocated during the flooding, the resources are continuously allocated until unnecessary resources are released by aging even after the flooding is finished. Therefore, resources cannot be allocated to new communication, and it takes time to start the communication.

An object of the present invention is to provide a technique capable of continuously securing a resource of communication to be originally performed even at the time of flooding without securing a communication resource of an uninterruptible apparatus more than necessary, and on the other hand, shortening a waiting time of new communication at the time of flooding.

Solution to Problem

In order to solve the above problem, according to an aspect of the present invention, there is provided an information processing device that is provided in a communication apparatus and performs a management process of traffic flow management information necessary for transfer of data including a plurality of frames from a transmission source terminal to a transmission destination terminal, and including an identification unit, a recording unit, a determination unit, and an extension unit. The identification unit identifies, on the basis of identification information included in a received data frame, a traffic flow associated with the data frame. The recording unit determines, in a case where new traffic flow management information of the traffic flow is recorded in the communication apparatus, whether the number of pieces of traffic flow management information already recorded is equal to or more than a threshold value, and calculates and records a scheduled release time of the recorded new traffic flow management information according to a determination result. The determination unit determines whether the traffic flow associated with the received data frame has already been recorded. The extension unit extends, in a case where the data frame associated with the recorded traffic flow is received, the scheduled release time of the traffic flow management information of the traffic flow according to the determination result when the traffic flow management information is first recorded for the traffic flow.

Advantageous Effects of Invention

According to one aspect of the present invention, it is possible to provide a technique capable of continuously securing a resource of communication to be originally performed even at the time of flooding without securing a communication resource of an uninterruptible apparatus more than necessary, and on the other hand, capable of shortening a waiting time of new communication at the time of flooding.

BRIEF DESCRIPTION OF DRAWINGS

FIG. 4 is a schematic diagram illustrating an example of written details of a recording storage time setting table included in the uninterruptible apparatus.

FIG. 5 is a schematic diagram illustrating an example of written details of a traffic flow management table included in the uninterruptible apparatus.

FIG. 6 is a schematic diagram illustrating an example of written details of a traffic flow management information management table included in the uninterruptible apparatus.

FIG. 8 is a schematic diagram illustrating an example of written details of a traffic flow management table at the time of registering new traffic flow management information.

FIG. 9 is a schematic diagram illustrating an example of written details of a traffic flow management information management table at the time of registering new traffic flow management information.

FIG. 10 is a schematic diagram illustrating an example of written details of the traffic flow management information management table at the time of extending traffic flow management information.

DESCRIPTION OF EMBODIMENTS

Hereinafter, an embodiment according to the present invention will be described with reference to the drawings.

A communication system performs multiplex communication of signals between a plurality of uninterruptible apparatuses via redundant routes including a plurality of relay routes. Hereinafter, for simplification of the drawings and description, a case where the number of relay routes is two, the number of uninterruptible apparatuses on a transmission side is one, and the number of uninterruptible apparatuses on a reception side is two will be described as an example, but the present invention is not limited thereto.

Configuration

Figure 1:
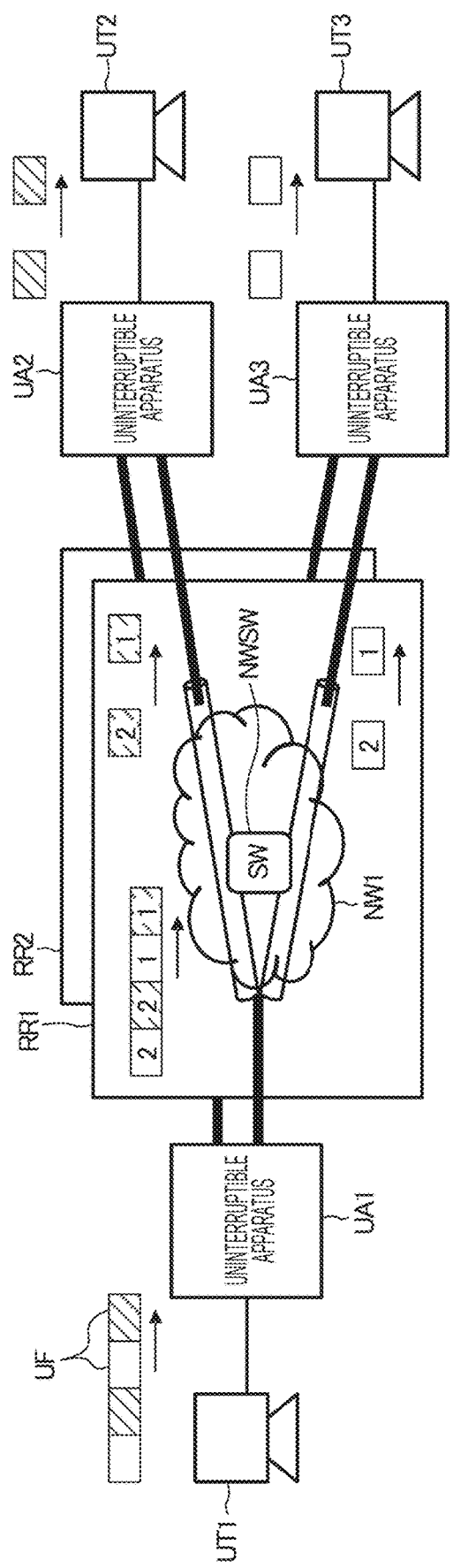
FIG. 1 is a block diagram illustrating an example of a schematic configuration of a communication system to which an embodiment of an information processing device of the present invention is applied.

FIG. 1 is a block diagram illustrating an example of a schematic configuration of a communication system to which an embodiment of an information processing device of the present invention is applied.

The communication system includes a first uninterruptible apparatus UA1 that is a communication apparatus on the transmission side, a second uninterruptible apparatus UA2 and a third uninterruptible apparatus UA3 that are communication apparatuses on the reception side, and a first relay route RR1 and a second relay route RR2 that are two relay routes provided therebetween. Hereinafter, when it is not necessary to particularly distinguish the first uninterruptible apparatus UA1, the second uninterruptible apparatus UA2, and the third uninterruptible apparatus UA3, the uninterruptible apparatuses will be referred to as an uninterruptible apparatus UA. Similarly, in a case where it is not necessary to particularly distinguish the two relay routes RR1 and RR2, the routes will be referred to as a relay route RR.

The first relay route RR1 is a part of a first relay network NW1, and the second relay route RR2 is a part of a second relay network NW2 (not illustrated). Hereinafter, in a case where it is not necessary to particularly distinguish the two relay networks NW1 and NW2, the relay networks will be referred to as a relay network NW. The relay network NW may be, for example, an Ethernet network. A network switch NWSW is disposed in each relay network NW.

A first user terminal UT1 is connected to the first uninterruptible apparatus UA1, a second user terminal UT2 is connected to the second uninterruptible apparatus UA2, and a third user terminal UT3 is connected to the third uninterruptible apparatus UA3. A user data frame UF to be transmitted from the first user terminal UT1 that is a transmission source to the second user terminal UT2 that is a destination and a user data frame UF to be transmitted to the third user terminal UT3 that is a destination are mixed and input to the first uninterruptible apparatus UA1. In FIG. 1, among the user data frames UF, the user data frame UF for the second user terminal UT2 and the user data frame UF for the third user terminal UT3 are illustrated separately by hatching the user data frame UF for the second user terminal UT2. The user data frame UF is, for example, a signal including a header and a data payload.

The first uninterruptible apparatus UA1 on the transmission side assigns a sequence number indicating the order to the input user data frame UF, duplicates the user data frame UF according to the number of relay routes RR, and sends the user data frame UF to each relay route RR. In this case, the first uninterruptible apparatus UA1 associates a pair of uninterruptible apparatuses as one traffic flow, and assigns a sequence number to each pair. That is, the first uninterruptible apparatus UA1 assigns sequence numbers 1, 2, . . . to the pair of the first uninterruptible apparatus UA1 and the second uninterruptible apparatus UA2, and also assigns sequence numbers 1, 2, . . . to the pair of the first uninterruptible apparatus UA1 and the third uninterruptible apparatus UA3.

The network switch NWSW of the relay network NW including each relay route RR learns MAC addresses of the second uninterruptible apparatus UA2, the third uninterruptible apparatus UA3, and the like that are destinations. On the basis of the MAC address learning information, the network switch NWSW transmits the user data frame UF addressed to the user terminal B to the relay route to the second uninterruptible apparatus UA2 and transmits the user data frame UF addressed to the user terminal C to the relay route to the third uninterruptible apparatus UA3, among the user data frames UF transmitted from the first uninterruptible apparatus UA1.

The second uninterruptible apparatus UA2 on the reception side receives the user data frame UF via each relay route RR and outputs the user data frame UF to the second user terminal UT2. For example, the second uninterruptible apparatus UA2 determines the user data frame UF that has arrived earlier on the basis of the sequence number assigned to each received user data frame UF, deletes the sequence number from the user data frame UF that has arrived earlier, and outputs the user data frame UF to the second user terminal UT2. The second uninterruptible apparatus UA2 discards the user data frame UF that has arrived later and to which the same sequence number is assigned.

Similarly, the third uninterruptible apparatus UA3 on the reception side receives the user data frame UF via each relay route RR, deletes the sequence number from the user data frame UF that has arrived earlier, and outputs the user data frame UF to the third user terminal UT3. The third uninterruptible apparatus UA3 discards the user data frame UF that has arrived later and to which the same sequence number is assigned.

Figure 2:
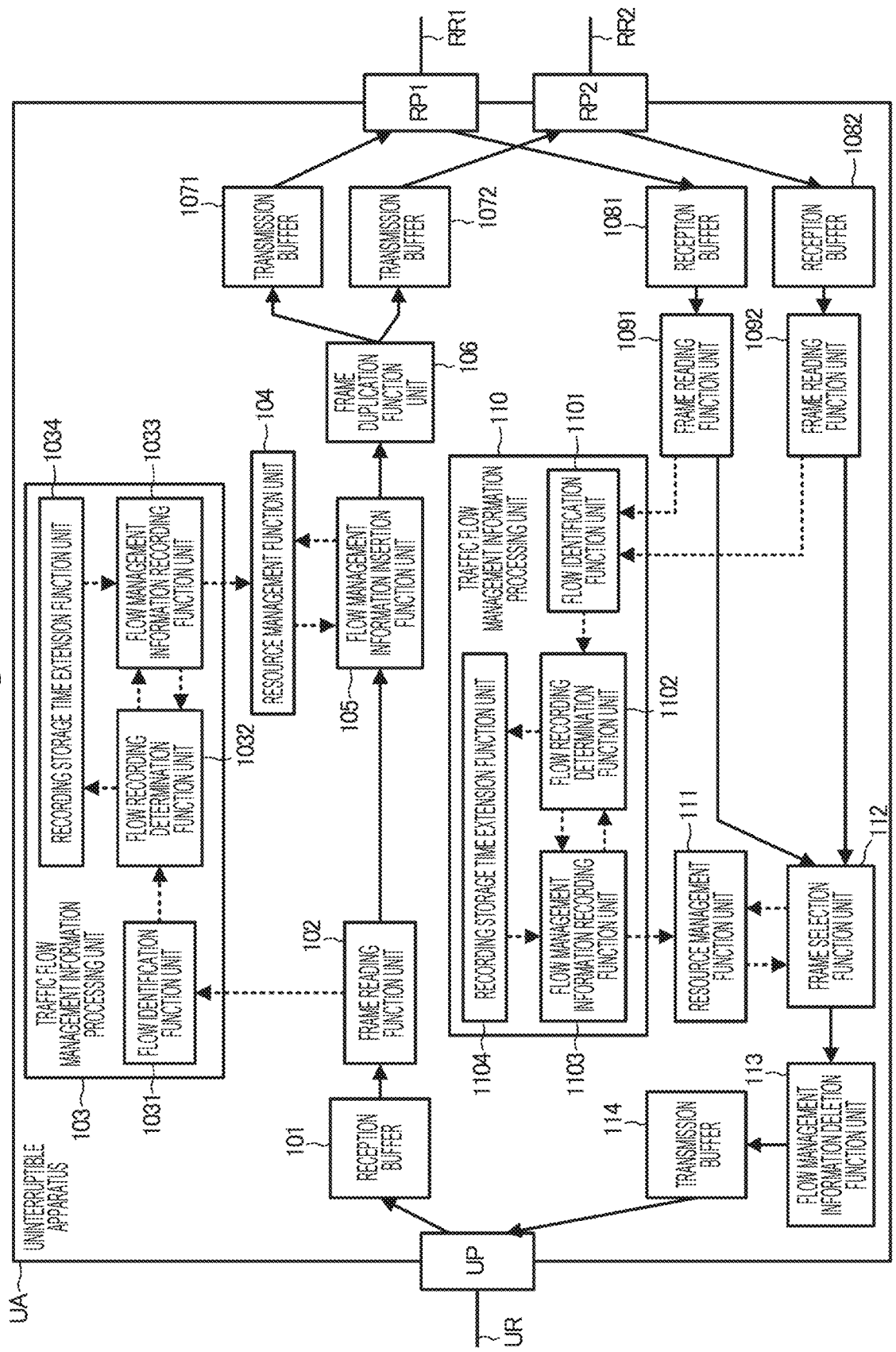
FIG. 2 is a block diagram illustrating an example of a functional configuration of an uninterruptible apparatus including a traffic flow management information processing unit as the information processing device according to the embodiment of the present invention.

FIG. 2 is a block diagram illustrating an example of a functional configuration of the uninterruptible apparatus UA.

The first uninterruptible apparatus UA1, the second uninterruptible apparatus UA2, and the third uninterruptible apparatus UA3 may have the same configuration. That is, although FIG. 1 illustrates an example in which the first uninterruptible apparatus UA1 is a communication apparatus on the transmission side, and the second uninterruptible apparatus UA2 and the third uninterruptible apparatus UA3 are communication apparatuses on the reception side, a different aspect may be employed. For example, the second uninterruptible apparatus UA2 may serve as a communication apparatus on the transmission side, the first uninterruptible apparatus UA1 and the third uninterruptible apparatus UA3 may serve as communication apparatuses on the reception side, and the user data frame UF from the second user terminal UT2 may be transmitted to the first user terminal UT1 and the third user terminal UT3. It is needless to say that the configuration related to transmission and the configuration related to reception may be separately formed as a transmission device and a reception device in the configuration of the uninterruptible apparatus UA in FIG. 2. In FIG. 2, a solid arrow indicates a flow of the user data frame UF, and a dotted arrow indicates a flow of a control signal.

In the example in FIG. 2, the uninterruptible apparatus UA includes a reception buffer 101, a frame reading function unit 102, a traffic flow management information processing unit 103, a resource management function unit 104, a flow management information insertion function unit 105, a frame duplication function unit 106, and transmission buffers 1071 and 1072 as functional configuration units related to transmission. The uninterruptible apparatus UA includes reception buffers 1081 and 1082, frame reading function units 1091 and 1092, a traffic flow management information processing unit 110, a resource management function unit 111, a frame selection function unit 112, a flow management information deletion function unit 113, and a transmission buffer 114 as functional configuration units related to reception. The uninterruptible apparatus UA includes a user port UP, and a first relay port RP1 and a second relay port RP2. Hereinafter, when it is not necessary to particularly distinguish the two relay ports RP1 and RP2, the relay ports will be referred to as a relay port RP.

Here, the user port UP is a port for receiving a user data frame UF input from the first user terminal UT1 that is a transmission source via the user route UR and transmitting the user data frame UF output to the first user terminal UT1 that is a transmission destination via the user route UR. The first relay port RP1 is a port for transmitting the user data frame UF to the first relay route RR1 and receiving the user data frame UF from the first relay route RR1. The second relay port RP2 is a port for transmitting the user data frame UF to the second relay route RR2 and receiving the user data frame UF from the second relay route RR2.

The reception buffer 101 stores the user data frame UF received by the user port UP and input from the first user terminal UT1 via the user route UR.

The frame reading function unit 102 reads the user data frame UF stored in the reception buffer 101, acquires a set of transmission source information and transmission destination information from the frame, and sends the set to the traffic flow management information processing unit 103. The frame reading function unit 102 supplies the read user data frame UF to the flow management information insertion function unit 105.

The traffic flow management information processing unit 103 is an information processing device according to an embodiment of the present invention that performs a management process on traffic flow management information necessary for transfer of the user data frame UF from a transmission source to a transmission destination. The traffic flow management information processing unit 103 includes a flow identification function unit 1031, a flow recording determination function unit 1032, a flow management information recording function unit 1033, and a recording storage time extension function unit 1034. The set of the transmission source information and the transmission destination information of the user data frame UF sent from the frame reading function unit 102 is input to the flow identification function unit 1031.

The flow identification function unit 1031 identifies a traffic flow from the set of the transmission source information and the transmission destination information of the input frame. The flow identification function unit 1031 transmits the identification result to the flow recording determination function unit 1032.

The flow recording determination function unit 1032 determines whether traffic flow management information of the traffic flow identified by the flow identification function unit 1031 has already been recorded. The flow recording determination function unit 1032 sends the determination result to the flow management information recording function unit 1033 and the recording storage time extension function unit 1034.

The flow management information recording function unit 1033 records a traffic flow ID and a scheduled release time in association with a traffic flow of which traffic flow management information is determined as not being recorded by the flow recording determination function unit 1032. In this case, the flow management information recording function unit 1033 determines an appropriate value from a plurality of recording storage times on the basis of a magnitude relationship of the number of pieces of recorded management information with respect to a threshold value, and calculates a scheduled release time. The flow management information recording function unit 1033 further records the calculated scheduled release time for the corresponding traffic flow. The flow management information recording function unit 1033 outputs the traffic flow ID indicating the traffic flow of the identified user data frame UF to the resource management function unit 104. The flow management information recording function unit 1033 requests the resource management function unit 104 to delete the traffic flow management information that has passed the scheduled release time.

In a case where the determination result from the flow recording determination function unit 1032 indicates that the traffic flow management information has already been recorded, the recording storage time extension function unit 1034 extends the scheduled release time of the corresponding traffic flow.

The resource management function unit 104 records and manages a dispensed situation of a sequence number that is traffic flow management information for the traffic flow ID of the traffic flow recorded by the flow management information recording function unit 1033. In response to a request from the flow management information insertion function unit 105, the resource management function unit 104 dispenses a sequence number for identifying the order of the user data frames UF in the traffic flow. Specifically, the resource management function unit 104 dispenses a sequence number subsequent to the traffic flow ID corresponding to the user data frame UF received by the user port UP as a sequence number of the corresponding user data frame UF. In response to a request from the flow management information recording function unit 1033, the resource management function unit 104 deletes a sequence number that has passed the scheduled release time among the sequence numbers of the traffic flow that are recorded and managed.

The flow management information insertion function unit 105 inserts the sequence number dispensed by the resource management function unit 104 into the user data frame UF read by the frame reading function unit 102. For example, the flow management information insertion function unit 105 adds the sequence number to a part of the header or the payload of the user data frame UF. The flow management information insertion function unit 105 inputs the user data frame UF into which the sequence number is inserted to the frame duplication function unit 106.

The frame duplication function unit 106 duplicates the user data frame UF input by the flow management information insertion function unit 105 according to the number of redundant routes, that is, according to the number of relay ports included in the uninterruptible apparatus UA. In the present embodiment, since the uninterruptible apparatus UA includes the two relay ports RP, the frame duplication function unit 106 duplicates the single user data frame UF to which the sequence number has been assigned by the flow management information insertion function unit 105 such that two user data frames UF are generated. The frame duplication function unit 106 supplies the user data frames UF to which the two sequence numbers are assigned to the transmission buffers 1071 and 1072 one by one.

The transmission buffer 1071 stores the user data frame UF supplied from the frame duplication function unit 106. The transmission buffer 1071 sends the stored user data frame UF to the first relay port RP1 to be transmitted to the uninterruptible apparatus UA on the reception side via the redundant route, that is, the first relay route RR1 of the two relay routes RR.

The transmission buffer 1072 stores the user data frame UF input from the frame duplication function unit 106. The transmission buffer 1072 sends the stored user data frame UF to the second relay port RP2 to be transmitted to the uninterruptible apparatus UA on the reception side via the second relay route RR2.

The reception buffer 1081 stores the user data frame UF received by the first relay port RP1 and input from the uninterruptible apparatus UA on the transmission side via the first relay route RR1.

The frame reading function unit 1091 reads the user data frame UF stored in the reception buffer 1081, acquires a set of transmission source information and transmission destination information from the frame, and sends the set to the traffic flow management information processing unit 110. The frame reading function unit 1091 supplies the read user data frame UF to the frame selection function unit 112.

The reception buffer 1082 stores the user data frame UF received by the second relay port RP2 and input from the uninterruptible apparatus UA on the transmission side via the second relay route RR2.

The frame reading function unit 1092 reads the user data frame UF stored in the reception buffer 1082, acquires a set of transmission source information and transmission destination information from the frame, and sends the set to the traffic flow management information processing unit 110. The frame reading function unit 1092 supplies the read user data frame UF to the frame selection function unit 112.

The traffic flow management information processing unit 110 performs a management process on traffic flow management information necessary for transfer of the user data frame UF from a transmission source to a transmission destination. The traffic flow management information processing unit 110 includes a flow identification function unit 1101, a flow recording determination function unit 1102, a flow management information recording function unit 1103, and a recording storage time extension function unit 1104. The set of the transmission source information and the transmission destination information of the user data frame UF sent from each of the frame reading function units 1091 and 1092 is input to the flow identification function unit 1031. The user data frame UF from one relay route RR may be delayed or may not reach due to a delay, a single-route disconnection, or the like of the relay route RR.

The flow identification function unit 1101 identifies a traffic flow from the set of the transmission source information and the transmission destination information of the user data frame UF input from the frame reading function unit 1091 and/or 1092. The flow identification function unit 1101 also identifies a sequence number of the user data frame UF. The flow identification function unit 1101 sends the identification result to the flow recording determination function unit 1102.

The flow recording determination function unit 1102 determines whether the traffic flow management information of the traffic flow identified by the flow identification function unit 1101 has already been recorded. The flow recording determination function unit 1102 sends the determination result to the flow management information recording function unit 1103 and the recording storage time extension function unit 1104.

The flow management information recording function unit 1103 records the traffic flow ID and the scheduled release time in association with the traffic flow of which traffic flow management information is determined as not being recorded. In this case, the flow management information recording function unit 1103 determines an appropriate value from a plurality of recording storage times on the basis of a magnitude relationship of the number of pieces of recorded management information with respect to a threshold value, and calculates a scheduled release time. The flow management information recording function unit 1103 further records the calculated scheduled release time for the corresponding traffic flow. The flow management information recording function unit 1103 outputs a traffic flow ID indicating the traffic flow of the identified user data frame UF to the resource management function unit 111. The flow management information recording function unit 1103 requests the resource management function unit 111 to delete traffic flow management information that has passed the scheduled release time.

In a case where the determination result from the flow recording determination function unit 1102 indicates that the traffic flow management information has already been recorded, the recording storage time extension function unit 1104 extends the scheduled release time of the corresponding traffic flow.

The resource management function unit 111 records and manages a received situation of a sequence number that is traffic flow management information for the traffic flow ID of each traffic flow recorded by the flow management information recording function unit 1103. The resource management function unit 111 sends the received situation of a sequence number to the frame selection function unit 112 in response to a request from the frame selection function unit 112. In response to a request from the flow management information recording function unit 1103, the resource management function unit 111 deletes a sequence number that has passed the scheduled release time among the sequence numbers of the traffic flow that are recorded and managed. The resource management function unit 111 manages a buffer included in the frame selection function unit 112 for each traffic flow. For example, the resource management function unit 111 discards a frame of a traffic flow corresponding to traffic flow management information that has passed the scheduled release time and is thus deleted among the user data frames UF buffered in the buffer of the frame selection function unit 112.

The frame selection function unit 112 selects a frame to be transmitted to the user terminal UT from the user data frame UF and the sequence number received from each relay route RR. Here, the frame selection function unit 112 includes a buffer for buffering the user data frame UF supplied from the frame reading function units 1091 and 1092 and coming from the plurality of relay routes RR for each traffic flow. From the traffic flow ID and the sequence number input from the resource management function unit 111, the frame selection function unit 112 selects, for each traffic flow, the user data frame UF that has arrived earlier among the user data frames UF supplied from the frame reading function units 1091 and 1092, and buffers the user data frame UF in the buffer. The user data frame UF that has arrived later is not buffered and is discarded. When the user data frame UF that has arrived earlier is buffered in the buffer, the frame selection function unit 112 arranges and stores the frames in the sequence number order. The frame selection function unit 112 supplies the user data frames UF arranged in sequence order to the flow management information deletion function unit 113 at a stage in which a predetermined amount of user data frames UF are accumulated in the buffer for each traffic flow. The frame selection function unit 112 deletes the user data frame UF of the traffic flow corresponding to traffic flow management information that has passed the scheduled release time and is thus deleted from the buffer in response to an instruction from the resource management function unit 111.

The flow management information deletion function unit 113 deletes, from the user data frame UF supplied from the frame selection function unit 112, the sequence number that is traffic flow management information assigned thereto. The flow management information deletion function unit 113 supplies the user data frame UF from which the sequence number has been deleted to the transmission buffer 114.

The transmission buffer 114 stores the user data frame UF supplied from the flow management information deletion function unit 113. The transmission buffer 114 sends the stored user data frame UF to the user port UP to be transmitted to the user terminal UT on the reception side via the user route UR.

Figure 3:
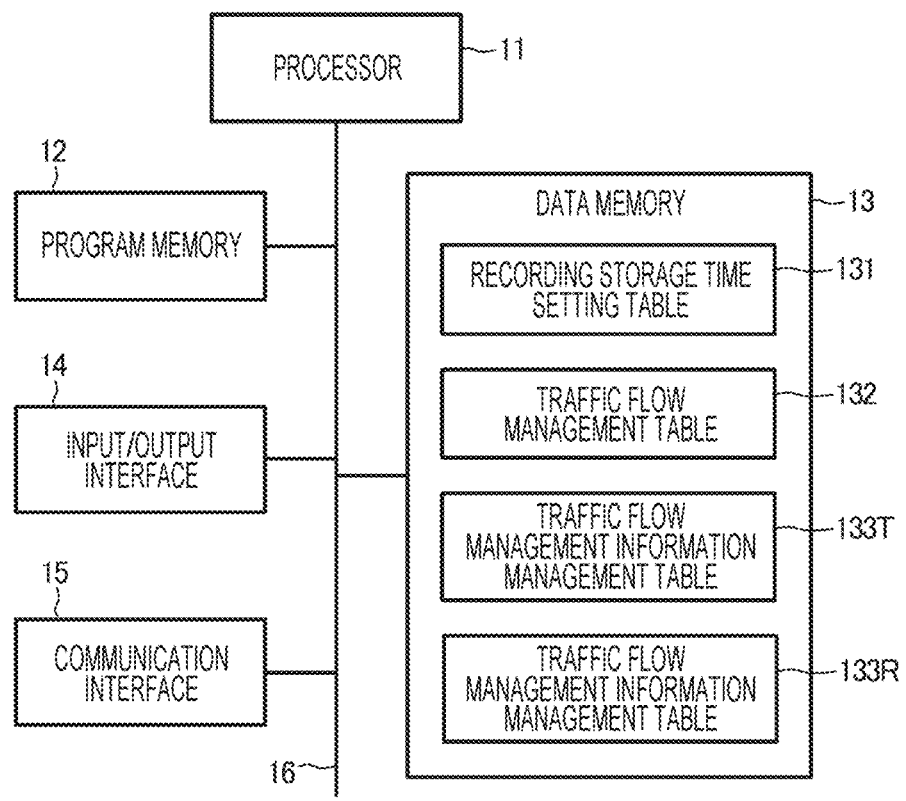
FIG. 3 is a diagram illustrating an example of a hardware configuration of the uninterruptible apparatus.

FIG. 3 is a diagram illustrating an example of a hardware configuration of the uninterruptible apparatus UA.

The uninterruptible apparatus UA may be configured by a computer as illustrated in FIG. 3. The uninterruptible apparatus UA includes a hardware processor 11 such as a central processing unit (CPU). In the uninterruptible apparatus UA, a program memory 12, a data memory 13, an input/output interface 14, and a communication interface 15 are connected to the processor 11 via a bus 16. The CPU can simultaneously execute a plurality of pieces of information processing by using a multi-core and a multi-thread. The processor 11 may include a plurality of CPUs.

The program memory 12 is a non-transitory tangible computer readable storage medium in which a non-volatile memory capable of writing and reading data at any time, such as a hard disk drive (HDD) or a solid state drive (SSD), and a non-volatile memory such as a read only memory (ROM) are used in combination. The program memory 12 stores a program necessary for the processor 11 to execute various types of control process according to the present embodiment. That is, all of the frame reading function unit 102, the traffic flow management information processing unit 103, the resource management function unit 104, the flow management information insertion function unit 105, the frame duplication function unit 106, the frame reading function units 1091 and 1092, the traffic flow management information processing unit 110, the resource management function unit 111, the frame selection function unit 112, and the flow management information deletion function unit 113 illustrated in FIG. 2 may be realized by causing the processor 11 to read and execute the program stored in the program memory 12. Some or all of these processing function units may be realized in other various forms including an integrated circuit such as an application specific integrated circuit (ASIC) or a field-programmable gate array (FPGA).

The data memory 13 is a tangible computer readable storage medium in which, for example, the above-described non-volatile memory and a volatile memory such as a random access memory (RAM) are used in combination. The data memory 13 is used to store various types of data acquired and created in the process of performing various processes. That is, in the data memory 13, a region for storing various types of data is appropriately secured in the process of performing various processes. For example, in the data memory 13, regions that function as the reception buffers 101, 1081, and 1082 and the transmission buffers 1071, 1072, and 114 illustrated in FIG. 2 are secured. In the data memory 13, a region for storing the recording storage time setting table 131, a region for storing the traffic flow management table 132, and a region for storing the two traffic flow management information management tables 133T and 133R can be secured. Details of each table will be described later.

The input/output interface 14 is the above-described user port UP illustrated in FIG. 2, and may be connected to the user terminal UT via the user route UR.

The communication interface 15 is the relay ports RP1 and RP2 illustrated in FIG. 2, and may be connected to the communication interface 15 of another uninterruptible apparatus UA via the relay routes RR1 and RR2. The communication interface 15 may include not only the ports but also a communication module according to a communication medium, a communication method, and a communication protocol of the relay route RR.

Here, a table stored in the data memory 13 will be described.

The recording storage time setting table 131 is a table in which a storage time of each piece of traffic flow management information recorded in the traffic flow management information management tables 133T and 133R by the flow management information recording function units 1033 and 1103 is written. FIG. 4 is a schematic diagram illustrating an example of written details of the recording storage time setting table 131. The recording storage time setting table 131 writes a storage time in association with the number of pieces of recorded traffic flow management information. The number of pieces of recorded traffic flow management information is the number of pieces of traffic flow management information already recorded in the traffic flow management information management tables 133T and 133R at the time of recording traffic flow management information of a new traffic flow. In the example in FIG. 4, in the recording storage time setting table 131, it is written that, with the number of pieces of traffic flow management information of 65 as a threshold value, the storage time is 1.0 second when the number is less than 65, that is, 64 or less, and the storage time is 0.2 seconds when the number is 65 or more.

The traffic flow management table 132 is a table for managing traffic flows identified by the flow identification function units 1031 and 1101. FIG. 5 is a schematic diagram illustrating an example of written details of the traffic flow management table 132. In the traffic flow management table 132, a new record is registered every time the flow identification function units 1031 and 1101 identify a new traffic flow. Each record includes a traffic flow ID that is a unique ID for specifying a traffic flow and traffic flow identification information that is information for identifying the traffic flow. It is conceivable that the traffic flow identification information is, for example, a set of MAC addresses of the user terminals UT that are a transmission destination and a transmission source included in the user data frame UF identified by the flow identification function units 1031 and 1101.

The traffic flow management information management tables 133T and 133R are tables for managing traffic flow management information. FIG. 6 is a schematic diagram illustrating an example of written details of the traffic flow management information management tables 133T and 133R. In the traffic flow management information management tables 133T and 133R, a new record in which information for managing traffic flow management information is written is registered every time the flow management information recording function units 1033 and 1103 determine that the traffic flow is a new traffic flow. Each record includes a traffic flow ID, the number of pieces of traffic flow management information when a new record is registered, and a scheduled release time. The number of pieces of traffic flow management information when a new record is registered is the number of pieces of traffic flow management information already registered in the resource management function units 104 and 111 at the time of registering the new record. The number of pieces of traffic flow management information already registered in the resource management function units 104 and 111 at the time of registering the new record can be rephrased as the number of records already registered in the traffic flow management information management tables 133T and 133R at that time. The scheduled release time is a time obtained by adding a recording storage time based on the recording storage time setting table 131 to the current time that is a time at the time of registering the new record in the traffic flow management information management tables 133T and 133R.

Operation

Next, an operation of the uninterruptible apparatus UA will be described.

In a case where the uninterruptible apparatus UA is configured by a computer as illustrated in FIG. 3, the processor 11 can operate as each function unit of the uninterruptible apparatus UA by executing the program stored in the program memory 12.

First, a transmission processing operation that is an operation on the transmission side of the uninterruptible apparatus UA will be described.

When the user data frame UF is input to the user port UP, the processor 11 functions as the frame reading function unit 102, acquires a set of transmission source information and transmission destination information from the input frame, and stores the set in a temporary storage region of the data memory 13. The transmission source information is, for example, a MAC address of the user terminal UT that is a transmission source and the transmission destination information is, for example, a MAC address of the user terminal UT that is a transmission destination.

The processor 11 executes a function as the traffic flow management information processing unit 103 on the basis of the set of the transmission source information and the transmission destination information stored in the temporary storage region of the data memory 13.

Figure 7:
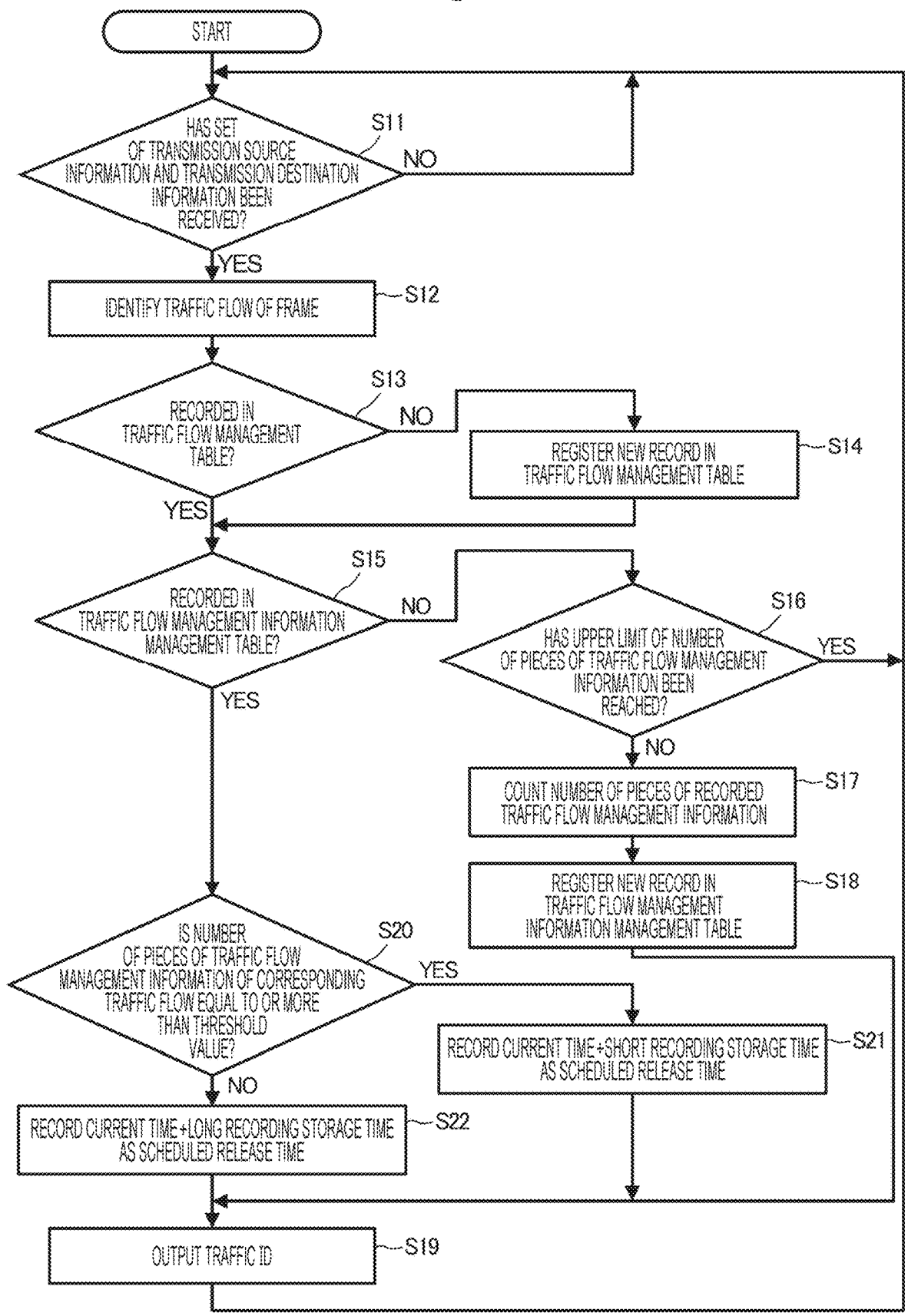
FIG. 7 is a flowchart illustrating an example of a processing operation of a traffic flow management information registration process in a traffic flow management information processing unit.

FIG. 7 is a flowchart illustrating an example of a processing operation of a traffic flow management information registration process in the traffic flow management information processing unit 103. The program memory 12 stores a program necessary for executing a control process illustrated in this flowchart, and the processor 11 executes the program, and thus the processor 11 can operate as the traffic flow management information processing unit 103.

The processor 11 functions as the flow identification function unit 1031 and determines whether or not a set of transmission source information and transmission destination information from the frame reading function unit 102 has been received, that is, whether or not a set of transmission source information and transmission destination information has been stored in a temporary storage unit (step S11). In a case where it is determined that a set of transmission source information and transmission destination information has not been received (NO in step S11), the processor 11 executes the processing operation in step S11 again. Thus, the processor 11 waits to receive a set of transmission source information and transmission destination information.

In a case where it is determined in step S11 that a set of transmission source information and transmission destination information has been received (YES in step S11), the processor 11 identifies a traffic flow of the user data frame UF input to the user port UP from the received set of the transmission source information and the transmission destination information (step S12).

The processor 11 determines whether or not the identified traffic flow has been recorded in the traffic flow management table 132 (step S13). For example, the processor 11 can perform this determination by determining whether or not traffic flow identification information corresponding to the identified traffic flow is registered in the traffic flow management table 132. The traffic flow identification information is, for example, a set of MAC addresses of the user terminals UT that are a transmission destination and a transmission source.

Here, in a case where it is determined that the identified traffic flow has not been recorded in the traffic flow management table 132 (NO in step S13), the processor 11 issues a new traffic flow ID and registers a new record for the traffic flow in the traffic flow management table 132 (step S14).

FIG. 8 is a schematic diagram illustrating an example of written details of the traffic flow management table 132 at the time of registering new traffic flow management information. In a case where a new traffic flow of which traffic flow identification information is A5 is identified in a situation in which written details of the traffic flow management table 132 are as illustrated in FIG. 5, a new record in which the traffic flow ID is 0007 is registered in step S14 as hatched in FIG. 8.

Next, alternatively, in a case where it is determined that the traffic flow identified in step S13 has been recorded in the traffic flow management table 132 (YES in step S13), the processor 11 executes a function as the flow recording determination function unit 1032. That is, the processor 11 determines whether or not the record for the traffic flow management information of the traffic flow identified in step S13 has been recorded in the traffic flow management information management table 133T (step S15). For example, the processor 11 may perform this determination by determining whether or not a record having a traffic flow ID of traffic flow identification information corresponding to the identified traffic flow is recorded in the traffic flow management information management table 133T.

In a case where it is determined that the record for the traffic flow management information has not been recorded (NO in step S15), the processor 11 executes a function as the flow management information recording function unit 1033. That is, the processor 11 determines whether or not the number of records registered in the traffic flow management information management table 133T has reached an upper limit of a registered number of pieces of traffic flow management information determined in advance (step S16). In a case where it is determined that the upper limit of the registered number of pieces of traffic flow management information has been reached (YES in step S16), the processor 11 causes the control process to proceed to step S11. That is, in a case where records have been recorded up to the upper limit of the number of pieces of traffic flow management information, since a traffic flow cannot be recorded any more, the subsequent sequence number cannot be allocated, and the input user data frame UF is discarded.

On the other hand, in a case where it is determined in step S16 that the upper limit of the registration number of the traffic flow management information has not been reached (NO in step S16), the processor 11 counts the number of pieces of traffic flow management information recorded in the resource management function unit 104 (step S17). This may be performed by counting the number of records recorded in the traffic flow management information management table 133T. For example, in the situation illustrated in FIG. 6, in a case where a new traffic flow is identified, four is counted as the number of pieces of recorded traffic flow management information.

The processor 11 registers a new record for the traffic flow management information in the traffic flow management information management table 133T on the basis of the counted number of pieces of traffic flow management information (step S18).

FIG. 9 is a schematic diagram illustrating an example of written details of the traffic flow management information management table 133T at the time of registering new traffic flow management information. As hatched in the same drawing, the processor 11 records a new record having the new traffic flow ID of 0007 registered in the traffic flow management table 132 in the traffic flow management information management table 133T. In this case, the processor 11 registers four that is the counted number of pieces of recorded traffic flow management information as the number of pieces of traffic flow management information at the time of registering new traffic flow management information. The processor 11 calculates a scheduled release time and registers the calculated scheduled release time. The processor 11 obtains the scheduled release time as follows. The processor 11 acquires an appropriate value of a recording storage time according to whether or not the recording storage time corresponding to the counted number of pieces of recorded traffic flow management information is equal to or more than a threshold value. That is, the processor 11 acquires, from the recording storage time setting table 131, the recording storage time of 1 second when the number of pieces of recorded traffic flow management information is less than 65 that is a threshold value, and the recording storage time of 0.2 seconds when the number of pieces of recorded traffic flow management information is 65 or more. The processor 11 calculates a value obtained by adding the current time to the acquired recording storage time as the scheduled release time. For example, assuming that the current time is 10:01:22 67, in the example in FIG. 9, the processor 11 adds 1 second that is the recording storage time corresponding to four that is the number of pieces of recorded traffic flow management information thereto, and records 10:01:23 67 as the scheduled release time.

Thereafter, the processor 11 outputs the traffic flow ID indicating the traffic flow of the input user data frame UF to the resource management function unit 104 (step S19). Specifically, the processor 11 temporarily stores the traffic flow ID of the user data frame UF that is a transmission target in the data memory 13.

On the other hand, in a case where it is determined in step S15 that the record for the traffic flow management information has been recorded (YES in step S15), the processor 11 functions as the recording storage time extension function unit 1034 and extends a scheduled release time of the corresponding traffic flow as follows. That is, the processor 11 determines whether or not the number of pieces of traffic flow management information of the record corresponding to the traffic flow at the time of registering new traffic flow management information is equal to or more than a threshold value, and is equal to or more than 65 in this example (step S20).

In a case where determining that the number of pieces of traffic flow management information at the time of registering new traffic flow management information is equal to or more than the threshold value (YES in step S20), the processor 11 records a time obtained by adding 0.2 seconds that is a short recording storage time in the recording storage time setting table 131 to the current time as an extended scheduled release time in the record for the corresponding traffic flow (step S21). Thereafter, the processor 11 causes the control process to proceed to step S19 described above.

On the other hand, in a case where determining that the number of pieces of traffic flow management information at the time of registering new traffic flow management information is not equal to or more than the threshold value (NO in step S20), the processor 11 records a time obtained by adding 1 second that is a long recording storage time in the recording storage time setting table 131 to the current time as an extended scheduled release time in the record for the corresponding traffic flow (step S22). Thereafter, the processor 11 causes the control process to proceed to step 319 described above.

FIG. 10 is a schematic diagram illustrating an example of written details of the traffic flow management information management table 133T at the time of extending traffic flow management information. Here, it is assumed that the current time is 10:02:22 67 that is one minute after 10:01:22 67 illustrated in FIG. 9. In this case, the user data frame UF is repeatedly input for each of the traffic flows having the traffic flow IDs of 0001, 0002, 0003, 0005, and 0007, and the scheduled release time is extended each time the user data frame UF is input. In a case where the user data frame UF of the traffic flow with the traffic flow ID of 0007 hatched in FIG. 10 is input, the processor 11 adds 1 second of the recording storage time corresponding to four that is the number of pieces of traffic flow management information at the time of registering new traffic flow management information, and records 10:02:23 67 as a scheduled release time.

Figure 11:
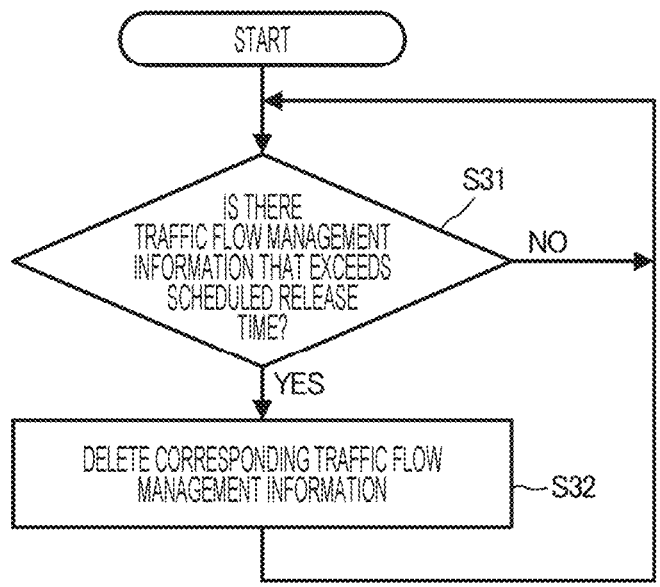
FIG. 11 is a flowchart illustrating an example of a processing operation of a traffic flow management information release process in the traffic flow management information processing unit.

The processor 11 executes a processing operation of a traffic flow management information release process in parallel with the processing operation of the traffic flow management information registration process in the traffic flow management information processing unit 103 as described above. FIG. 11 is a flowchart illustrating an example of a processing operation of traffic flow management information release process in the traffic flow management information processing unit. The program memory 12 stores a program necessary for executing a control process illustrated in this flowchart, and the processor 11 executes the program, and thus the processor 11 can operate as the traffic flow management information processing unit 103.

The processor 11 functions as the flow management information recording function unit 1033, and determines whether or not there is traffic flow management information of which the current time exceeds the scheduled release time among the pieces of traffic flow management information managed by the resource management function unit 104 (step S31). This determination may be performed by determining whether or not there is traffic flow management information of which the current time exceeds the scheduled release time among the records of the traffic flow management information registered in the traffic flow management information management table 133T. In a case where it is determined that there is no traffic flow management information of which the current time exceeds the scheduled release time (NO in step S31), the processor 11 executes the processing operation in step S31 again.

In a case where it is determined in step S31 that there is traffic flow management information of which the current time exceeds the scheduled release time (YES in step S31), the processor 11 deletes the traffic flow management information from the resource management function unit 104 (step S32). In this case, the processor 11 deletes the record for the traffic flow management information from the traffic flow management information management table 133T. For example, it is assumed that the current time reaches 10:02:22 76 in the traffic flow management information management table 133T illustrated in FIG. 10. In this case, when the user data frame UF of the traffic flow indicated by the traffic flow ID of 0005 is not input, the processor 11 deletes the record for the traffic flow management information from the traffic flow management information management table 133T. In this case, the record for the corresponding traffic flow ID may also be deleted from the traffic flow management table 132. Thereafter, the control process proceeds to step S31 described above.

As described above, the processor 11 updates the traffic flow management information management table 133T.

The processor 11 functions as the resource management function unit 104 and checks the traffic flow ID of the user data frame UF that is a transmission target temporarily stored in the data memory 13. The processor 11 dispenses a sequence number subsequent to the dispensed sequence number for the traffic flow ID as a sequence number for the user data frame UF that is a transmission target input to the user port UP. The processor 11 may store the dispensed sequence number in the data memory 13 in association with each traffic flow ID. The processor 11 may determine a sequence number to be dispensed on the basis of the stored sequence number.

Next, the processor 11 functions as the flow management information insertion function unit 105 and inserts the sequence number into the user data frame UF input to the user port UP. The processor 11 functions as the frame duplication function unit 106, duplicates the user data frame UF into which the sequence number is inserted, sends the duplicated user data frames UF to the two relay ports RP, and thus transmits the user data frame UF from each relay port RP to the uninterruptible apparatus UA on the reception side via each relay route RR. Thereafter, the processor 11 finishes the transmission processing operation and prepares for the input of the next user data frame UF.

Next, a reception processing operation that is an operation on the reception side of the uninterruptible apparatus UA will be described.

When the user data frame UF is received by any of the relay ports RP, the processor 11 functions as the frame reading function unit 1091 or 1092, acquires a set of the transmission source information and the transmission destination information from the input frame, and stores the set in the temporary storage region of the data memory 13. The transmission source information is, for example, a MAC address of the user terminal UT that is a transmission source and the transmission destination information is, for example, a MAC address of the user terminal UT that is a transmission destination. The processor 11 also acquires a sequence number from the input user data frame UF, and stores the sequence number in the temporary storage region of the data memory 13.

The processor 11 executes a function as the traffic flow management information processing unit 110 on the basis of the set of the transmission source information and the transmission destination information stored in the temporary storage region of the data memory 13. That is, the processor 11 executes processing operations of the traffic flow management information registration process and the traffic flow management information release process as described above with reference to FIGS. 7 and 11.

That is, the processor 11 functions as the flow identification function unit 1101 to identify a traffic flow, and functions as the flow recording determination function unit 1102 to update the traffic flow management table 132 and the traffic flow management information management table 133R. In particular, the processor 11 calculates a scheduled release time by using a short or long recording storage time according to whether or not the number of pieces of traffic flow management information in the traffic flow management information management table 133R at that time is equal to or more than a threshold value. The processor 11 registers a new record for the traffic flow management information in the traffic flow management information management table 133R, and records the new traffic flow management information in the resource management function unit 111. The processor 11 updates registered details of the record registered in the traffic flow management information management table 133R. The processor 11 outputs the traffic flow ID and the sequence number of the user data frame UF received by the relay port RP1 or RP2 and input from the traffic flow management information processing unit 110. The processor 11 causes the resource management function unit 111 to delete the traffic flow management information that has passed the scheduled release time, and deletes the record for the corresponding traffic flow management information from the traffic flow management information management table 133R.

The traffic flow management information is a communication resource learned by the uninterruptible apparatus UA. There is a high possibility that a resource learned at the time of flooding is an extra resource, and there is a high possibility that a resource learned when flooding does not occur is a resource of communication to be originally performed. Therefore, in the present embodiment, focusing on an increase in the number of resources to be learned during flooding, the number of pieces of traffic flow management information that is the number of resources to arrive at the time of learning each resource is monitored, and an aging time, that is, a scheduled release time is changed according to the number. Therefore, a threshold value is set for the number of resources, and the aging time is set to be long in a case where the number of arriving resources at the time of learning each resource is less than a threshold value, and the aging time is set to be short in a case where the number of arriving resources is more than the threshold value.

Specifically, the processor 11 identifies a traffic flow of the received user data frame UF. In a case where the number of pieces of traffic flow management information of the traffic flow recorded in the traffic flow management information management table 133R at the time of registering new traffic flow management information is equal to or more than a threshold value, flooding is likely to occur. Therefore, the processor 11 adds a short recording storage time to the recorded scheduled release time of the resource to update the scheduled release time. In a case where the number of pieces of traffic flow management information at the time of registering new traffic flow management information is less than the threshold value, the processor 11 adds a long recording time to the recorded scheduled release time to update the scheduled release time.

As described above, since there is a high possibility that flooding has occurred in a case where the number of pieces of traffic flow management information is equal to or more than the threshold value, by applying a short aging time, unnecessary resources are released immediately after the flooding is finished, and thus the start time of new communication can be shortened. On the other hand, since a long aging time is applied as an aging time for a resource of communication originally to be performed when the number of pieces of traffic flow management information is less than the threshold value, unnecessary resource release is not performed, and communication originally to be performed is not inhibited. Therefore, it is possible to achieve both continuation of communication to be performed even at the time of flooding and shortening of a waiting time for new communication.

The processor 11 functions as the resource management function unit 111, and records and manages a received situation of a sequence number for a traffic flow ID of the user data frame UF input from the traffic flow management information processing unit 110. The processor 11 functions as the frame selection function unit 112, and selects a frame to be transmitted to the user terminal UT from the user data frame UF and the sequence number received from each relay route RR. Specifically, the processor 11 selects the user data frame UF that has arrived earlier for each traffic flow from the traffic flow ID and the sequence number and buffers the user data frame UF in the buffer, and does not buffer the user data frame UF that has arrived later but discards the user data frame UF. There may be a case where only the user data frame UF from one relay route RR arrives and the user data frame UF from the other relay route RR does not arrive due to a delay, a single-route disconnection, or the like of the relay route RR. When buffering the user data frame UF that has arrived earlier in the buffer, the processor 11 arranges and stores the frames in sequence number order. The processor 11 functions as the flow management information deletion function unit 113, and deletes the sequence numbers from the user data frames UF arranged in sequence order at a stage in which a predetermined amount of user data frames UF are accumulated in the buffer for each traffic flow. Thereafter, the processor 11 sends the user data frame UF from which the sequence number is deleted to the user port UP, and thus transmits the user data frame UF from the user port UP to the user terminal UT on the receiving side via the user route UR.

The processor 11 functions as the frame selection function unit 112, and if there is traffic flow management information that has passed the scheduled release time, deletes the user data frame UF of the corresponding traffic flow from the buffer.

As described above, the traffic flow management information processing units 103 and 110 that are information processing devices that are provided in the uninterruptible apparatus UA that is a communication apparatus and performs a management process on a sequence number that is traffic flow management information necessary for transfer of user data of a plurality of frames from the user terminal UT that is a transmission source to the user terminal UT that is a transmission destination, include the flow identification function units 1031 and 1101 that are identification units, the flow management information recording function units 1033 and 1103 that are records, the flow recording determination function units 1032 and 1102 that are determination units, and the recording storage time extension function units 1034 and 1104 that are extension units. The flow identification function units 1031 and 1101 identify a traffic flow associated with the user data frame UF on the basis of identification information included in the received user data frame UF. In a case where new traffic flow management information of the traffic flow is recorded in the resource management function units 104 and 111 of the uninterruptible apparatus UA, the flow management information recording function units 1033 and 1103 determine whether the number of pieces of traffic flow management information already recorded is equal to or more than a threshold value, calculate a scheduled release time of the recorded new traffic flow management information according to the determination result, and record the calculated scheduled release time in the traffic flow management information management tables 133T and 133R. In a case where the flow recording determination function units 1032 and 1102 determine whether the traffic flow associated with the received user data frame UF has already been recorded and determine that the user data frame UF associated with the recorded traffic flow has been received, the recording storage time extension function units 1034 and 1104 extend the scheduled release time of the traffic flow management information of the traffic flow according to a determination result when the traffic flow management information has been recorded for the first time for the traffic flow.

As a result, it is possible to continuously secure a resource of communication to be originally performed even at the time of flooding without securing more traffic flow management information as a communication resource learned by the uninterruptible apparatus UA than necessary, and on the other hand, it is also possible to shorten a waiting time of new communication at the time of flooding by quickly releasing unnecessary communication resources.

The flow management information recording function units 1033 and 1103 have a plurality of recording storage times selected according to determination results as the recording storage time setting table 131, and calculate a scheduled release time by adding the current time to a recording storage time selected according to a determination result. Similarly, the recording storage time extension function units 1034 and 1104 extend the scheduled release time to a time calculated by adding the current time to the recording storage time selected according to the determination result.

Therefore, a scheduled release time can be easily determined on the basis of the current time.

A recording storage time when the number of pieces of traffic flow management information already recorded in the determination result is equal to or more than a threshold value is shorter than a recording storage time when the number of pieces of traffic flow management information already recorded is less than the threshold value.

Therefore, since there is a high possibility that flooding has occurred in a case where the number of pieces of traffic flow management information is equal to or more than the threshold value, by applying a short aging time, unnecessary resources are released immediately after the flooding is finished, so that the start time of new communication can be shortened. On the other hand, since a long aging time is applied as an aging time for a resource of communication originally to be performed when the number of pieces of traffic flow management information is less than the threshold value, unnecessary resource release is not performed, and communication originally to be performed is not inhibited. Therefore, it is possible to achieve both continuation of communication to be performed even at the time of flooding and shortening of a waiting time for new communication.

In a case where there is traffic flow management information that has reached the scheduled release time, the flow management information recording function units 1033 and 1103 request the resource management function units 104 and 111 of the uninterruptible apparatus UA to delete the corresponding traffic flow management information.

Therefore, the traffic flow management information that has reached the scheduled release time can be quickly deleted, and release of an unnecessary resource can be performed.

In this case, the flow management information recording function units 1033 and 1103 delete a record including a scheduled release time recorded for the traffic flow management information reaching the scheduled release time from the traffic flow management information management tables 133T and 133R.

Therefore, it is possible to quickly delete an unnecessary record and secure a region for managing new traffic flow management information.

Other Embodiments

In the above embodiment, the number of pieces of traffic flow management information at the time of registering new traffic flow management information is recorded in the traffic flow management information management tables 133T and 133R, but, since this is an attribute for determining whether flooding is being performed at the time of resource learning, the present invention is not necessarily limited to this. For example, instead of a value itself of the number of pieces of traffic flow management information, whether the number of pieces of traffic flow management information is equal to or more than a threshold value with respect to the threshold value of the traffic flow may be separately determined, and the determination result may be recorded.

Although the traffic flow management table 132 is shared by the traffic flow management information processing unit 103 on the transmission side and the traffic flow management information processing unit 110 on the reception side, separate traffic flow management tables may be used. In order to secure a capacity of the traffic flow management table 132, a record for an old traffic flow ID may be periodically deleted.

In the traffic flow management information processing unit 103 on the transmission side, processing for the traffic flow management information as in the traffic flow management information processing unit 110 on the reception side is not performed, and only a function of managing a traffic flow ID may be performed. That is, since flooding does not occur on the transmission side, the traffic flow management information processing unit 103 may have only a function of identifying a traffic flow of the user data frame UF and outputting the traffic flow ID to the resource management function unit 104.

The number of pieces of traffic flow management information and the recording storage time recorded in the recording storage time setting table 131, the processing procedures illustrated in the flowcharts of FIGS. 7 and 11, and the like are merely examples, and it goes without saying that the present invention is not limited thereto.

The methods described in each of the embodiments may be stored in a recording medium such as a magnetic disk (a floppy (registered trademark) disk, a hard disk, or the like), an optical disc (a CD-ROM, a DVD, an MO, or the like), or a semiconductor memory (a ROM, a RAM, a flash memory, or the like) as programs (software means) that can be executed by a computing machine (computer), or may also be distributed by being transmitted through a communication medium. The programs stored in the medium side also include a setting program for configuring, in the computing machine, software means (including not only an execution program but also tables and data structures) to be executed by the computing machine. The computing machine that implements the present device executes the above-described processing by reading the programs recorded in the recording medium, constructing the software means by the setting program as needed, and controlling the operation by the software means. The recording medium described in the present specification is not limited to a recording medium for distribution, but includes a storage medium such as a magnetic disk or a semiconductor memory provided in the computing machine or in a device connected via a network.

In short, the present invention is not limited to the above-described embodiments, and various modifications can be made in the implementation stage without departing from the concept thereof. The respective embodiments may be implemented in appropriate combination if possible, and in this case, combined effects can be achieved. The above-described embodiments include inventions at various stages, and various inventions can be extracted by appropriate combinations of a plurality of disclosed constituents.

REFERENCE SIGNS LIST

11 Processor
12 Program memory
13 Data memory
14 Input/output interface
15 Communication interface
101, 1081, 1082 Reception buffer
102 Frame reading function unit
103, 110 Traffic flow management information processing unit
1031, 1101 Flow identification function unit
1032, 1102 Flow recording determination function unit
1033, 1103 Flow management information recording function unit
1034, 1104 Recording storage time extension function unit
104, 111 Resource management function unit
105 Flow management information insertion function unit
106 Frame duplication function unit
1071, 1072, 114 Transmission buffer
1091, 1092 Frame reading function unit
112 Frame selection function unit
113 Flow management information deletion function unit
131 Recording storage time setting table
132 Traffic flow management table
133T, 133R Traffic flow management information management table
NW, NW1, NW2 Relay network
NWSW Network switch
RP, RP1, RP2 Relay port
RR, RR1, RR2 Relay route
UA, UA1, UA2, UA3 Uninterruptible apparatus
UF User data frame
UP User port
UR User route
UT, UT1, UT2, UT3 User terminal

The invention claimed is:

1. An information processing device, comprising:
identification circuitry that, on the basis of identification information included in a received data frame, identifies a traffic flow associated with the data frame;
recording circuitry that, in a case where new traffic flow management information of the traffic flow is recorded in a communication apparatus, determines whether a number of pieces of traffic flow management information already recorded is equal to or more than a threshold value, and calculates and records a scheduled release time of the recorded new traffic flow management information according to a determination result;
determination circuitry that determines whether the traffic flow associated with the received data frame has already been recorded; and
extension circuitry that, in a case where the data frame associated with the recorded traffic flow is received, extends the scheduled release time of the traffic flow management information of the traffic flow according to the determination result when the traffic flow management information is first recorded for the traffic flow.

2. The information processing device according to claim 1, wherein:
the recording circuitry
has a plurality of recording storage times selected according to the determination result, and
calculates the scheduled release time by adding a current time to a recording storage time selected according to the determination result, and
the extension circuitry extends the scheduled release time to a time calculated by adding the current time to the recording storage time selected according to the determination result.

3. The information processing device according to claim 2, wherein the recording storage time when the number of pieces of the traffic flow management information already recorded is equal to or more than the threshold value in the determination result is shorter than the recording storage time when the number of pieces of traffic flow management information already recorded is less than the threshold value.

4. The information processing device according to claim 1, wherein;
in a case where there is traffic flow management information that has reached the scheduled release time, the recording circuitry requests the communication apparatus to delete the corresponding traffic flow management information.

5. The information processing device according to claim 4, wherein:
the recording circuitry deletes the scheduled release time recorded for the traffic flow management information that has reached the scheduled release time.

6. A communication apparatus comprising:
the information processing device according to claim 1;
management circuitry that records and manages the traffic flow management information of the traffic flow;
selection circuitry that selects a data frame of the traffic flow from among the received data frames on the basis of the traffic flow management information; and
deletion circuitry that deletes the identification information from the selected data frame and outputs the data frame to the transmission destination terminal.

7. An information processing method, comprising:

Causing an information processing device to, on the basis of identification information included in a received data frame, identify a traffic flow associated with the data frame;

causing the information processing device to, in a case where new traffic flow management information of the traffic flow is recorded in a communication apparatus, determine whether a number of pieces of traffic flow management information already recorded is equal to or more than a threshold value, and calculate and record a scheduled release time of the recorded new traffic flow management information according to a determination result;

causing the information processing device to determine whether the traffic flow associated with the received data frame has already been recorded; and causing the information processing device to, in a case where the data frame associated with the recorded traffic flow is received, extend the scheduled release time of the traffic flow management information of the traffic flow according to the determination result when the traffic flow management information is first recorded for the traffic flow.

8. A non-transitory computer readable medium storing a program for causing a processor to function as each of the elements of the information processing device according to claim 1.

9. A non-transitory computer readable medium storing a program for causing a processor to perform the steps of claim 7.

* * * * *